United States Patent
Morgan, Jr.

(10) Patent No.: US 7,832,206 B2
(45) Date of Patent: Nov. 16, 2010

(54) SYSTEMS AND METHODS FOR CONTROLLING AUTOMATIC TRANSMISSION FLUID

(75) Inventor: Christopher C. Morgan, Jr., Plymouth, MI (US)

(73) Assignee: Toyota Motor & Engineering North America, Inc., Erlanger, KY (US)

(*) Notice: Subject to any disclaimer, the term of this patent is extended or adjusted under 35 U.S.C. 154(b) by 362 days.

(21) Appl. No.: 12/046,911

(22) Filed: Mar. 12, 2008

(65) Prior Publication Data
US 2009/0233763 A1 Sep. 17, 2009

(51) Int. Cl.
*F16D 31/00* (2006.01)
*F16H 61/14* (2006.01)

(52) U.S. Cl. .......................... 60/329; 60/337

(58) Field of Classification Search .......... 60/329, 60/330, 337, 361; 192/3.23, 3.24, 3.31; 477/98
See application file for complete search history.

(56) References Cited

U.S. PATENT DOCUMENTS

| | | | | |
|---|---|---|---|---|
| 3,465,614 | A | * | 9/1969 | Reynolds ................ 477/98 |
| 4,680,928 | A | * | 7/1987 | Nishikawa et al. ........... 60/337 |
| 4,838,126 | A | | 6/1989 | Wilfinger et al. |
| 4,876,923 | A | | 10/1989 | Crandall et al. |
| 5,275,069 | A | | 1/1994 | Baba et al. |
| 5,310,033 | A | | 5/1994 | Shibayama |
| 6,419,059 | B1 | * | 7/2002 | Nobu et al. ............... 192/3.3 |
| 6,974,011 | B2 | | 12/2005 | Gradu et al. |
| 2005/0211523 | A1 | | 9/2005 | Takahashi |

* cited by examiner

*Primary Examiner*—Thomas E Lazo
(74) *Attorney, Agent, or Firm*—Dinsmore & Shohl LLP

(57) ABSTRACT

Systems and methods of controlling automatic transmission fluid (ATF) in a vehicle include torque converter systems generally having a pump, a turbine and a stator. The stator is selectively rotated during periods of predetermined low ATF temperature, thereby causing temporarily induced inefficiencies that warm the ATF.

19 Claims, 3 Drawing Sheets

SYSTEMS AND METHODS FOR CONTROLLING AUTOMATIC TRANSMISSION FLUID

TECHNICAL FIELD

The present invention generally relates to systems and methods for controlling the automatic transmission fluid within an automatic transmission.

BACKGROUND

Automatic transmission fluid (ATF) is used in automatic transmissions, including torque converters. Temperature changes in automatic transmissions cause both the viscosity and density of the ATF to vary. For example, when a vehicle is initially started, particularly in a cold climate, the ATF may be too cold for efficient operation because it is more viscous and more difficult for components of the transmission, such as the torque converter, to handle. As such, parasitic losses occur which adversely affect the fuel economy and performance of the vehicle.

Accordingly, systems and method for efficiently warming the ATF are desired.

SUMMARY

According to one embodiment, a system for heating automatic transmission fluid includes a pump mechanically coupled to an engine output shaft, a turbine mechanically coupled to a transmission input shaft, a stator located between the pump and turbine and associated with a stator locking mechanism, the stator locking mechanism for selectively allowing or preventing rotation of the stator and a temperature sensor for sensing the temperature of the automatic transmission fluid, wherein when an operational speed of the pump is about equal to an operational speed of the turbine and the temperature of the automatic transmission fluid is at or below a predetermined temperature, the stator locking mechanism prevents rotation of the stator.

According to yet another embodiment, a method of controlling automatic transmission fluid temperature includes providing a torque converter system comprising: a pump mechanically coupled to an engine output shaft, a turbine mechanically coupled to a transmission input shaft, a stator located between the pump and the turbine and a temperature sensor, monitoring the temperature of the automatic transmission fluid with the temperature sensor, selectively allowing rotation of the stator when the temperature sensor provides a low temperature signal indicating that the automatic transmission fluid is at or below a predetermined temperature and the operational speed of the turbine is less than the operational speed of the pump, and selectively preventing rotation of the stator when the temperature sensor provides a low temperature signal indicating that the automatic transmission fluid is at or below a predetermined temperature and the operational speed of the turbine is about equal to the operational speed of the pump.

According to yet another embodiment, a method of controlling automatic transmission fluid temperature of a vehicle in a torque converter system including a pump mechanically coupled to an engine output shaft, a turbine mechanically coupled to a transmission input shaft, a stator located between the pump and the turbine and a temperature sensor is provided. The method includes preventing rotation of the stator at an initial start of the vehicle and allowing rotation of the stator after a predetermined amount of time has elapsed from the initial start of the vehicle.

These and additional features can be more fully understood in view of the following detailed description, in conjunction with the drawings.

BRIEF DESCRIPTION OF THE DRAWINGS

The embodiments set forth in the drawings are illustrative and exemplary in nature and not intended to be limited of the inventions defined by the claims. Moreover, the individual features of the drawings will be more fully apparent and understood in view of the detailed description. The following detailed description of specific embodiments can be best understood when read in conjunction with the following drawings, where like structure is indicated with like reference numerals and in which:

DETAILED DESCRIPTION

Embodiments of the invention generally relate to systems and methods of controlling automatic transmission fluid (ATF) in a vehicle. Automatic transmission fluid may be any fluid utilized in an automatic transmission, including ATF, gear oil, or other similar fluid. As will be discussed herein, the systems for heating ATF, such as torque converters, generally comprise a pump, a turbine, a stator, a fluid path in which ATF flows and a temperature sensor for sensing the temperature of the transmission and/or the ATF. The stator is selectively prevented from rotating during periods of predetermined low ATF temperature, and permitted to rotate during periods of predetermined normal or high ATF temperature. Selectively preventing the stator from rotating when the ATF temperature reaches a predetermined low causes inefficiencies in the operation of systems/components of the transmission, such as torque converter systems, that ultimately allows the ATF to quickly warm to a desired temperature.

Figure 1:
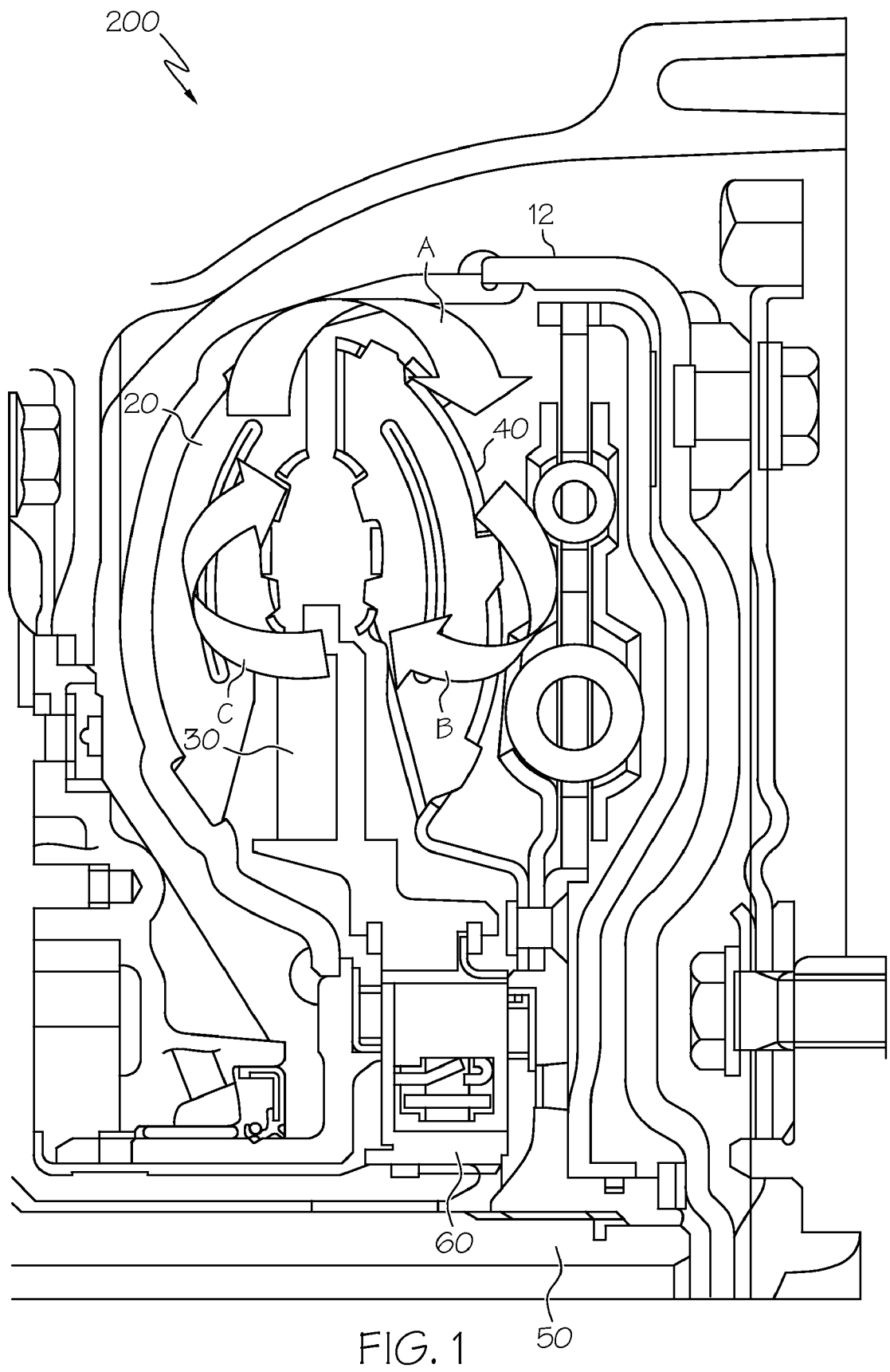
FIG. 1 is a partial cross-sectional view of a torque converter system for warming automatic transmission fluid illustrating an operational mode according to one or more embodiments of the present invention.
Figure 2:
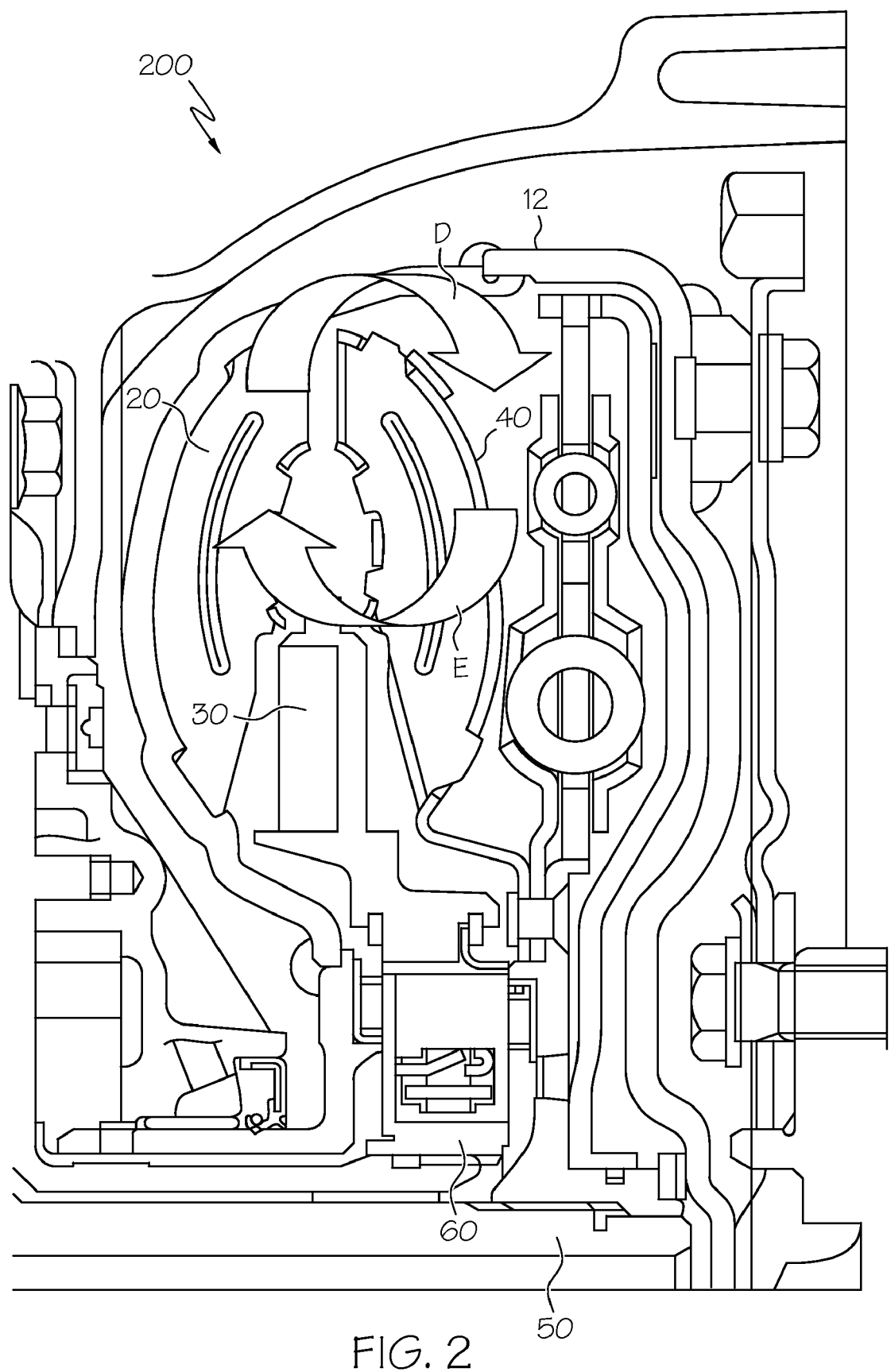
FIG. 2 is a partial cross-sectional view of a torque converter system for warming automatic transmission fluid illustrating an operational mode according to one or more embodiments of the present invention.

Referring to FIGS. 1-2, partial cross-sectional views of exemplary torque converter systems 200 with schematically illustrated operational modes are shown. It is understood that a number of torque converters may be implemented and utilized with the systems and methods described herein. Generally, a torque converter comprises three elements: an impeller or pump 20, a stator 30 and a turbine 40, each of which can be enclosed by cover 12. The pump 20 can be mechanically coupled to the engine (not shown) by any appropriate coupling assemblies, such as bolts or other components and turn at engine speed. The turbine 40 can be mechanically coupled to a transmission input shaft 50 and can drive a load. As illustrated in FIGS. 1 and 2, the stator 30 is interposed between the pump 20 and the turbine 40 and can function to manipulate ATF flow returning from the turbine 40 back to the pump 20. The stator may further comprise blades that redirect the flow of the ATF.

The stator 30 may be associated with a stator locking mechanism 60 in a manner to selectively allow or prevent the stator 30 from rotating in a clockwise or a counterclockwise direction. The stator locking mechanism 60 may be controlled according to input from a temperature sensor (not shown). The temperature sensor may be utilized to monitor the temperature of the ATF. The temperature sensor may be located anywhere within the transmission (including the torque converter system 200), and may comprise, for example, a bi-metallic switch, mercurial sensor or any other appropriate temperature sensing component. The temperature sensor may be calibrated at a predetermined temperature set-point, where a temperature below the temperature set-point is a low temperature signal in which stator 30 rotation is prevented, and a temperature above the temperature set-point is a high temperature signal in which stator 30 rotation is permitted. The temperate set-point should be set at an optimum operating temperature for the specific vehicle to ensure maximum gearbox efficiency. As an example and not a limitation, the temperature set-point may be set at 90° C.±10° C. for vehicle types. When the ATF reaches 90° C.±10° C. in this example, the stator will be permitted to rotate, according to some embodiments.

Referring to FIGS. 1-2, in normal operation, the ATF may flow in two directions. Particularly, the ATF flows both through the turbine 40 blades and also spins in the same direction as the engine. During a period of low vehicle speed (e.g., when a vehicle accelerates from a stop) the operational speed of the pump 20 is greater than the operational speed of the turbine 40. During this cycle, as illustrated by arrow A in FIG. 1, the pump 20 pushes the ATF into the turbine 40 through a fluid path. The ATF then leaves the turbine 40 and enters the stator 30 as illustrated by arrow B. The ATF makes contact with the front of curved blades of stator 30 which redirects the fluid toward the direction of rotation of the engine. In this manner, the ATF is spinning when it returns to the pump 20 (arrow C). In normal operation, the stator locking mechanism 60 can prevent rotation of the stator 30 in a direction opposite of the pump 20 and turbine 40, which improves the redirection of ATF from the turbine 40 and ultimately the pump 20.

While still in normal operation, as the speed of the turbine 40 and the vehicle increases, and the speed of the turbine 40 is substantially equal to the speed of the pump 20 (e.g., speed of turbine is about 90% of the speed of the pump), the ATF spins more quickly in the direction of the engine. During this cycle, the ATF begins hitting the back sides of the blades of the stator 30, causing the stator 30 to rotate in the same direction as the pump 20 and the turbine 40. The ability of the stator to redirect the ATF may therefore be reduced. As illustrated in FIG. 2, fluid from the pump 20 flows slowly into the turbine 40 (arrow D) and is no longer redirected by the stator 30 (arrow E).

According to one exemplary embodiment, methods and systems for establishing a warming operation wherein the stator 30 may be prevented from rotating during a period of low ATF temperature can be can be instituted to warm the ATF to a desired temperature. For example and referring to FIG. 2, when the speed of the turbine 40 is substantially equal to the speed of the pump 20 and upon input from the temperature sensor that ATF temperature is low, lock mechanism 60 may effectively lock the stator 30, whereby the stator 30 is prevented from rotating in the same direction as the pump 20 (e.g., the stator 30 is in a stationary mode in the warming operation). Because the stator 30 is not rotating, the flow of the ATF is interrupted, causing temporarily induced inefficiencies that quickly warm the ATF. After the ATF reaches an optimum or high temperature, the stator 30 may be put in a rotational mode, whereby the stator 30 is permitted to rotate, thus removing ATF flow interruptions and allowing the ATF to flow as it would in a conventional torque converter.

In another embodiment, methods and systems for establishing a warming operation wherein the stator 30 may be allowed to rotate during a period of low ATF temperature may be instituted to warm the ATF to a desired temperature. For example and referring to FIG. 1, when the speed of the turbine 40 is less than the speed of the pump 20 and upon input from the temperature sensor that ATF temperature is low, stator locking mechanism 60 may effectively release the stator 30. Allowing rotation of the stator at such turbine/speed differentials causes temporarily induced inefficiencies that warm the ATF. After the ATF reaches an optimum or high temperature, the stator 30 may remain in a rotational mode, or be temporarily locked and again released. For example, when the ATF reaches an optimum temperature and the speed of the turbine 40 is less than the speed of the pump 20, the stator 30 may be locked. Additionally, when the ATF temperature is low and the speed of the turbine 40 is about equal to the speed of the pump 20, the stator 30 may be locked.

The speed of the turbine 40 may be determined or estimated in a multitude of ways. For example, a transmission or torque converter sensor (e.g., optical rotation sensor or magnetic pickup sensor) may be located in the torque converter that senses the speed of the turbine 40 and provides a turbine speed signal to an on-board computer. The speed of the pump 20 which is equal to the engine speed, may be sensed with a tachometer or output shaft sensor. In another embodiment, the speed of the turbine 40 may be calculated based on rotational speeds of the transmission after a gear set by multiplying the speed of the shaft by the gear ratio between the turbine 40 and the sensor. Therefore, when the vehicle reaches a certain speed (e.g., 40 mph), the speed of the turbine 40 may be approximately equal to the speed of the pump 20. This sensor may also comprise the vehicle speed sensor, in which case, the overall vehicle gear ratio including transmission, transfer case, and differential ratios are used to calculate the rotational speed of the turbine.

Figure 3:
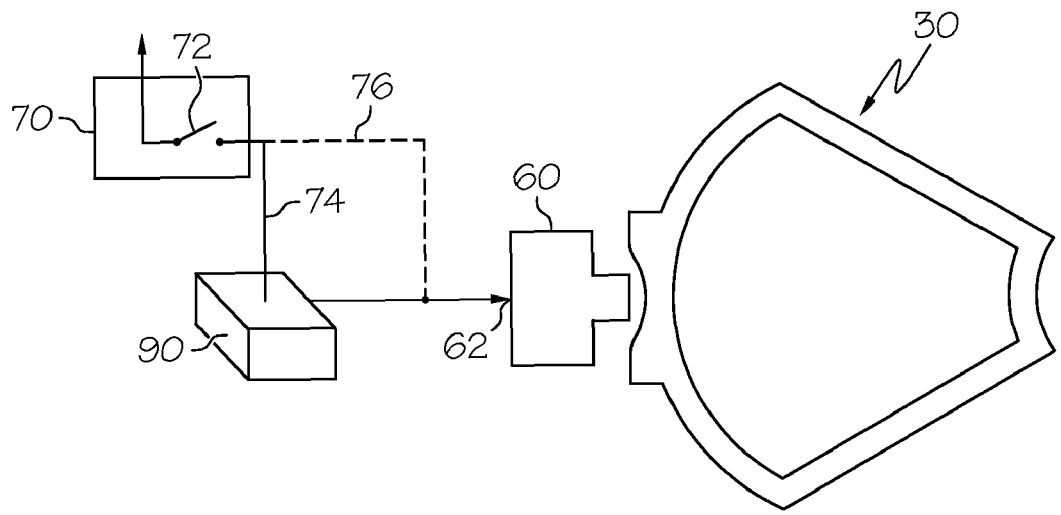
FIG. 3 is a schematic of a torque converter system for warming automatic transmission fluid according to one or more embodiments of the present invention.

FIG. 3 is a schematic illustration of a system for heating automatic transmission fluid (e.g., establishing a warming mode) according to one exemplary embodiment. As described above, the stator locking mechanism 60 can prevent stator 30 rotation in an opposite direction of the pump 20. The stator locking mechanism 60 may also prevent rotation of the stator in the same direction as the pump 20 when the ATF temperature is low. In one embodiment, the temperature sensor 70 can be configured as a bi-metallic switch 72 that provides a low temperature output signal and a high temperature output signal depending on the temperature of the ATF. The temperature sensor 70 can provide an output signal to an on-board computer 90 via transmission path 74. The on-board computer is a computer within the vehicle that monitors vehicle diagnostics and controls the input and output signals of the vehicle. Upon receiving the signal, the on-board computer may prevent stator rotation by sending a signal to the stator locking mechanism input 62. According to another embodiment that does not utilize an on-board computer, the temperature sensor 70 may provide a signal directly to the stator locking mechanism input 62 directly via transmission path 76. According to yet other embodiments, the stator locking mechanism 60 may be controlled thermostatically, hydraulically or mechanically. For example, the stator locking mechanism input 62 may be configured as an electrical input or a mechanical lever that is actuated hydraulically or mechanically, for example.

In addition, the stator locking mechanism 60 may be configured as a bi-directional clutch in which not only is stator 30 rotation prevented in a direction opposite to the pump 20 and in the same direction as the pump 20. The bi-directional clutch may be controlled by an on-board computer 90 (e.g., FIG. 3) according to one embodiment. The on-board computer 90 may send a signal instructing the bi-directional clutch to allow rotation in either a clockwise or counterclockwise direction, both a clockwise and a counterclockwise direction, or neither direction.

According to other embodiments, the stator locking mechanism 60 may also be configured as a one-way stator clutch that may selectively lock the stator in the same rotational direction as the pump 20. For example, the one-way stator clutch may comprise a bi-metallic thermostatic spring that prevents the stator from rotating during a period of low ATF temperature. Other embodiments may utilize a one-way stator clutch that comprises a servo actuated locking mechanism or a hydraulically actuated locking mechanism as the stator locking mechanism 60. The stator locking mechanism 60 should incorporate a fail-safe mode or construction such that the stator locking mechanism 60 is normally unlocked, which would prevent overheating the transmission and/or hazardous situations for the operator should the stator locking mechanism 60 fail.

Figure 4:
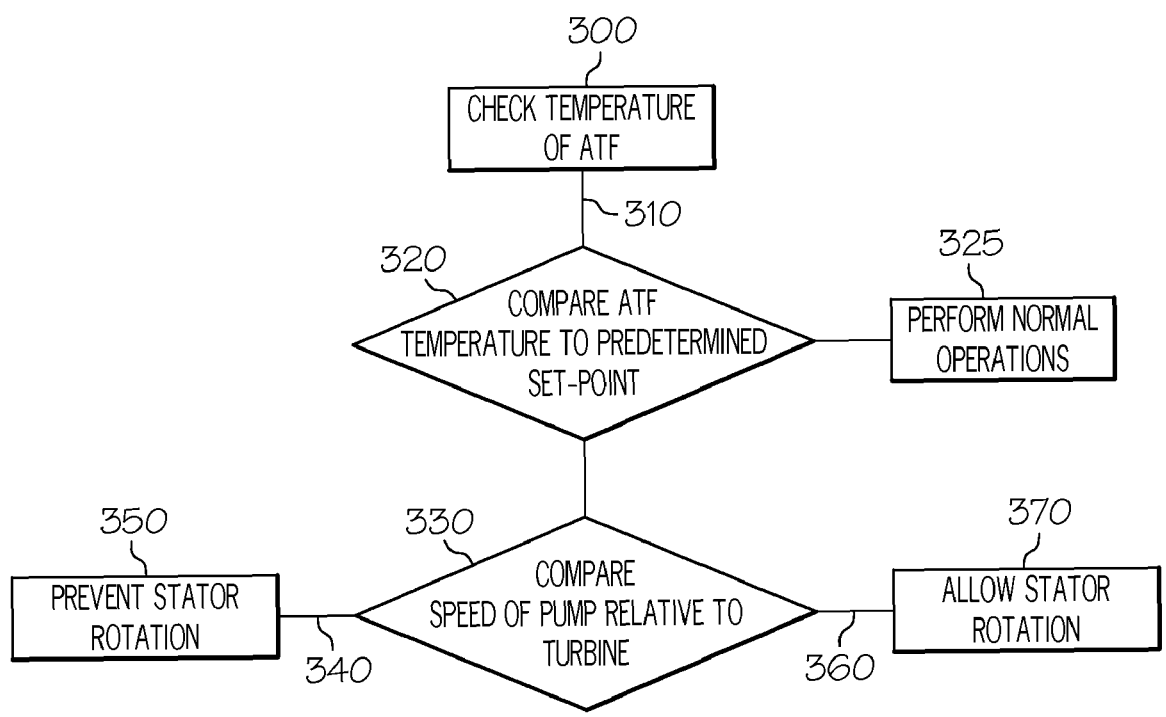
FIG. 4 is a flow chart illustrating a method of controlling automatic transmission fluid temperature in a torque converter system according to one or more embodiments of the present invention.

FIG. 4 is a flow-chart diagram illustrating an exemplary method of controlling ATF temperature in a torque converter system according to one embodiment. The temperature sensor may be constantly or intermittently determining the temperature of the ATF 300. The temperature sensor may relay an output signal(s) to a device, such as an on-board computer having predetermined temperature set-points calibrated and set dynamically depending on transmission, vehicle, temperature and driving conditions 310. After the on-board computer receives a temperature signal, which may be provided constantly or at periodic intervals, the on-board computer (or the stator locking mechanism in an embodiment wherein the temperature sensor relays an output signal directly to a locking mechanism) compares the temperature signal with a temperature set-point in block 320. Similarly, on-board computer (or the stator locking mechanism) may receive signals regarding the speed of the turbine relative to the speed of the pump 330. In one embodiment, if the speed of the pump is substantially equal to the speed of the turbine 340 and the temperature signal is lower than the temperature set-point (i.e., the ATF is not sufficiently warm), the stator is prevented from rotation in block 350, thereby warming the ATF. This process can be repeated. However, in another embodiment, if the speed of the turbine is less than the speed of the pump 360 and the temperature signal is lower than the temperature set-point (i.e., the ATF is not sufficiently warm), the stator can be allowed to rotate 370, similarly warming the ATF. When temperature of the ATF is above the temperature set-point, normal operations can be performed in block 325.

According to another embodiment, the stator 30 may be controlled via a timer-based stator locking mechanism 60. For example, the stator locking mechanism 60 may lock and unlock the stator 30 by use of a stator timer. For example, after the vehicle as been started and is accelerating from a stop, the stator locking mechanism 60 may lock the stator 30 for a predetermined amount of time so as to warm the ATF. After the predetermined amount of time is reached, the stator locking mechanism 60 may then release the stator 30 to operate the stator 30 normally. The predetermined amount of time may be unique to the type of vehicle, and may range from a few seconds to several minutes or longer. The stator timer may be effectuated by the on-board computer, a timer located within the stator locking mechanism 60 or other similar configurations. The timing may begin (e.g., stator timer initiation) at the initial start of the vehicle, which may be upon starting the vehicle or the initial acceleration of the vehicle.

Accordingly, systems and methods described herein can establish a warming operation wherein the stator 30 is selectively allowed to and prevented from rotating according to the speed of the pump relative to the speed of the turbine, as well as the temperature of the ATF so as to cause temporarily induced inefficiencies that ultimately warm the ATF so that overall parasitic losses are reduced, which adversely affect the fuel economy and performance of the vehicle can be minimized.

The foregoing description of the various embodiments and principles of the inventions has been presented for the purpose of illustration and description. It is not intended to be exhaustive or to limit the invention to the precise forms disclosed. Many alternatives, modifications and variations will be apparent to those skilled in the art. Moreover, although many inventive aspects have been presented, such aspects need not be utilized in combination, and various combinations of inventive aspects are possible in light of the various embodiments provided above. Accordingly, the above description is intended to embrace all possible alternatives, modifications, combinations and variations that have been discussed or suggested herein, as well as others that fall within the principles, spirit, and broad scope of the various inventions as defined by the claims.

For the purposes of describing and defining the present invention it is noted that the terms "substantially" or "approximately," is utilized herein to represent the inherent degree of uncertainty that may be attributed to any quantitative comparison, value, measurement, or other representation.

What is claimed is:

1. A system for heating automatic transmission fluid comprising:
   a pump mechanically coupled to an engine output shaft;
   a turbine mechanically coupled to a transmission input shaft;
   a stator located between the pump and turbine and associated with a stator locking mechanism, the stator locking mechanism for selectively allowing or preventing rotation of the stator; and
   a temperature sensor for sensing the temperature of the automatic transmission fluid;
   wherein when an operational speed of the turbine is about equal to an operational speed of the pump and the temperature of the automatic transmission fluid is at or below a predetermined temperature, the stator locking mechanism prevents rotation of the stator.

2. The system according to claim 1 wherein the stator locking mechanism receives a signal from the temperature sensor to prevent rotation of the stator.

3. The system according to claim 1 wherein the stator locking mechanism is a bi-metallic thermostatic spring that selectively allows or prevents rotation of the stator.

4. The system according to claim 1 wherein the stator locking mechanism is a hydraulically actuated unit that locks the stator when actuated.

5. The system according to claim 1 wherein the stator locking mechanism is a bi-directional clutch.

6. The system according to claim 5 wherein the stator locking mechanism is controlled by an on-board computer.

7. The system according to claim 5 wherein the bi-directional clutch allows for stator rotation when the temperature sensor provides a high temperature signal.

8. The system according to claim 1 wherein when the operational speed of the turbine is less than the operational speed of the pump and the temperature of the automatic transmission fluid is at or below a predetermined temperature, the stator locking mechanism allows rotation of the stator.

9. The system according to claim 1 wherein the temperature sensor is a bi-metallic switch.

10. A method of controlling automatic transmission fluid temperature comprising:
provic&ing a torque converter system comprising:
a pump mechanically coupled to an engine output shaft;
a turbine mechanically coupled to a transmission input shaft;
a stator located between the pump and the turbine;
a temperature sensor;
monitoring the temperature of the automatic transmission fluid with the temperature sensor;
monitoring the speed of the turbine relative to the speed of the pump;
selectively allowing rotation of the stator when the temperature sensor provides a low temperature signal indicating that the automatic transmission fluid is at or below a predetermined temperature and the operational speed of the turbine is less than the operational speed of the pump; and
selectively preventing rotation of the stator when the temperature sensor provides a low temperature signal indicating that the automatic transmission fluid is at or below a predetermined temperature and the operational speed of the turbine is about equal to the operational speed of the pump.

11. The method of controlling automatic transmission fluid temperature of claim 10 further comprising preventing rotation of the stator when the temperature sensor provides a high temperature signal indicating that the automatic transmission fluid is at or above the predetermined temperature and the operational speed of the turbine is less than the operational speed of the pump.

12. The method of controlling automatic transmission fluid temperature of claim 10 further comprising allowing rotation of the stator when the temperature sensor provides a high temperature signal indicating that the automatic transmission fluid is at or above the predetermined temperature and the operational speed of the turbine is about equal to the operational speed of the pump.

13. The method of controlling automatic transmission fluid temperature of claim 10 further comprising interrupting the flow of the automatic transmission fluid through the stator.

14. The method of controlling automatic transmission fluid temperature of claim 10 wherein the torque converter system further comprises a stator locking mechanism configured to selectively allow rotation or prevent rotation of the stator.

15. The method of controlling automatic transmission fluid temperature of claim 10 further comprising monitoring an operational speed of the turbine relative to the pump.

16. The method of controlling automatic transmission fluid temperature of claim 15 wherein the operational speed of the turbine is monitored by a turbine sensor and the operational speed of the pump is monitored by a tachometer.

17. A method of controlling automatic transmission fluid temperature of a vehicle in a torque converter system comprising a pump mechanically coupled to an engine output shaft, a turbine mechanically coupled to a transmission input shaft and a stator located between the pump and the turbine, the method comprising:
preventing rotation of the stator at an initial start of the vehicle; and
allowing rotation of the stator after a predetermined amount of time has elapsed from the initial start of the vehicle.

18. The method of controlling automatic transmission fluid temperature of claim 17 wherein the method further comprises:
initializing a stator timer at the initial start of the vehicle, wherein the stator timer counts the time elapsed from the initial start of the vehicle; and
allowing rotation of the stator after the stator timer is equal to or greater than the predetermined amount of time.

19. The method of controlling automatic transmission fluid temperature of claim 18 wherein the stator timer is controlled by an on-board computer.

* * * * *